(12) United States Patent
Shanmugam et al.

(10) Patent No.: US 11,795,107 B2
(45) Date of Patent: Oct. 24, 2023

(54) ENCAPSULATION OF SILICA NANOPARTICLE FOR RELEASE

(71) Applicant: Aramco Services Company, Houston, TX (US)

(72) Inventors: Sivaprakash Shanmugam, Houston, TX (US); Peter Boul, Houston, TX (US); Carl Thaemlitz, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 473 days.

(21) Appl. No.: 16/991,845

(22) Filed: Aug. 12, 2020

(65) Prior Publication Data

US 2022/0048819 A1 Feb. 17, 2022

(51) Int. Cl.
| | | |
|---|---|---|
| *E21B 33/14* | (2006.01) | |
| *C04B 20/10* | (2006.01) | |
| *C04B 14/06* | (2006.01) | |
| *C04B 28/04* | (2006.01) | |
| *C04B 40/00* | (2006.01) | |
| *C01B 33/18* | (2006.01) | |
| *B82Y 30/00* | (2011.01) | |

(Continued)

(52) U.S. Cl.
CPC .......... *C04B 20/1037* (2013.01); *C01B 33/18* (2013.01); *C04B 14/062* (2013.01); *C04B 28/04* (2013.01); *C04B 40/0032* (2013.01); *B82Y 30/00* (2013.01); *B82Y 40/00* (2013.01); *C04B 20/0008* (2013.01); *C04B 40/0082* (2013.01); *E21B 33/14* (2013.01)

(58) Field of Classification Search
None
See application file for complete search history.

(56) References Cited

U.S. PATENT DOCUMENTS

| 7,784,542 B2 | 8/2010 | Roddy et al. |
| 7,806,183 B2 | 10/2010 | Roddy et al. |
| 7,892,352 B2 | 2/2011 | Roddy et al. |

(Continued)

FOREIGN PATENT DOCUMENTS

| CN | 106800812 A | 6/2017 |
| CN | 106800846 A | 6/2017 |

(Continued)

OTHER PUBLICATIONS

Bing Yu et al., "Multiresponsive Square Hybrid Nanosheets of POSS-Ended Hyperbranched Poly(ether amine) (hPEA)", 45 Macromolecules, ACS Publications, 2012, pp. 7135-7142.

(Continued)

*Primary Examiner* — Charles R Nold
(74) *Attorney, Agent, or Firm* — Bracewell LLP; Constance G. Rhebergen; Eleanor T. Porter (57) ABSTRACT

A method of producing a nanosilica-containing cement formulation, the method comprising the steps of mixing an amount of a determinant nanosilica particle and a functional coating; applying a dynamic initiator to trigger a reversible reaction of the functional coating to produce a reversible cage, where the reversible cage surrounds the determinant nanosilica particle to produce an encapsulated nanosilica; and mixing the encapsulated nanosilica and a cement formulation to produce the nanosilica-containing cement formulation.

6 Claims, 5 Drawing Sheets

(51) Int. Cl.
*B82Y 40/00* (2011.01)
*C04B 20/00* (2006.01)

(56) References Cited

U.S. PATENT DOCUMENTS

| | | | |
|---|---|---|---|
| 8,658,213 | B2 | 2/2014 | Hoheisel et al. |
| 8,691,935 | B2 | 4/2014 | Harkabus |
| 8,877,954 | B2 | 11/2014 | Giesenberg et al. |
| 8,901,186 | B2 | 12/2014 | Eling et al. |
| 9,018,313 | B2 | 4/2015 | Chun et al. |
| 9,068,109 | B2 | 6/2015 | Rana et al. |
| 9,199,879 | B2 | 12/2015 | Thaemlitz et al. |
| 9,296,896 | B2 | 3/2016 | Jain et al. |
| 9,587,158 | B2 | 3/2017 | Ivanec et al. |
| 9,920,235 | B2 | 3/2018 | Boul et al. |
| 2003/0234103 | A1* | 12/2003 | Lee .......... C09K 8/70 507/224 |
| 2008/0021147 | A1 | 1/2008 | Jun |
| 2008/0066916 | A1* | 3/2008 | Li .......... C09K 8/602 507/239 |
| 2008/0314594 | A1* | 12/2008 | Still .......... C09K 8/72 166/307 |
| 2010/0006209 | A1 | 1/2010 | Femmer |
| 2011/0118382 | A1 | 5/2011 | Reichenbach-Klinke et al. |
| 2014/0158354 | A1* | 6/2014 | Kumar .......... C04B 28/14 166/292 |
| 2014/0290958 | A1* | 10/2014 | Marr .......... C09K 8/524 166/311 |
| 2014/0332217 | A1 | 11/2014 | Rahman et al. |
| 2015/0260009 | A1 | 9/2015 | Rahman et al. |
| 2017/0030077 | A1* | 2/2017 | Wang .......... C09K 5/063 |
| 2018/0346797 | A1* | 12/2018 | Kalgaonkar .......... C09K 8/5751 |

FOREIGN PATENT DOCUMENTS

| | | |
|---|---|---|
| WO | 2012032099 A1 | 3/2012 |
| WO | 2014165399 A1 | 10/2014 |
| WO | 2018222648 A1 | 12/2018 |

OTHER PUBLICATIONS

Fernandes et al., "Synthesis And Properties Of Highly Dispersed Ionic Silica—Poly(Ethylene Oxide) Nanohybrids", ACS Nano, American Chemical Society, Jan. 27, 2013, 1265-1271.

Pang et al., "Nanosilicas As Accelerators In Oilwell Cementing At Low Temperatures", SPE Drilling & Completion, Mar. 2014, pp. 98-105.

Van Damme et al., "Anthracene-Containing Polymers Toward High-End Applications", Elsevier< Progress in Polymer Science 82, 2018, 92-119.

Zhilong Su et al., Hybrid Core-Shell Microspheres from Coassembly of Anthracene-Containing POSS (POSS-AN) and Anthracene-Ended Hyperbranched Poly(ether amine) (hPEA-AN) and Their Responsive Polymeric Hollow Microspheres 46 Macromolecules 3519-3528 (2013).

ISRWO dated Nov. 30, 2021, issued for PCT/US2021/045486, 14 pages.

Su et al., "Responsive Fluorescent Nanorods From Coassembly of Fullerene (C60) and Anthracene-Ended Hyperbranched Poly(ether amine) (AN-HPEA)", Macromolecules 46, American Chemical Society, 2013, pp. 3699-3707.

Yu et al., "CO2-Responsive Fluorescent Hyperbranded Poly (Ether Amines)", Polymer Chemistry, www.RSC.org, Jun. 19, 2017, pp. 1-8.

\* cited by examiner

ENCAPSULATION OF SILICA NANOPARTICLE FOR RELEASE

TECHNICAL FIELD

Disclosed are compositions and methods for use with cement. Specifically, disclosed are compositions and methods for improving the properties of cement.

BACKGROUND

Surface modifications of nanomaterials such as gold nanoparticles, iron oxide nanoparticles and silica nanoparticles may be carried out through attachment of reactive moieties that are used to graft polymers from their surfaces or to attach pre-grafted polymers onto their surfaces. Surface modification of nanosilica surfaces has utility in the modification of the physicochemical properties of the particles. These properties may then be exploited for improved material and process performances.

In cement chemistry, the use of colloidal silica nanoparticles is known to enhance the strength of Portland cement setting and reduce the porosity of cement and accelerate the rate of cement setting. However, the benefits of colloidal silica use are often undermined by cement slurry gelation induced by the nanosilica.

SUMMARY

Disclosed are compositions and methods for use with cement. Specifically, disclosed are compositions and methods for monitoring cement in a downhole environment.

In a first aspect, a method of producing a nanosilica-containing cement formulation is provided. The method includes the steps of mixing an amount of a determinant nanosilica particle and a functional coating, applying a dynamic initiator to trigger a reversible reaction of the functional coating to produce a reversible cage, where the reversible cage surrounds the determinant nanosilica particle to produce an encapsulated nanosilica, and mixing the encapsulated nanosilica and a cement formulation to produce the nanosilica-containing cement formulation.

In certain aspects, the method further includes the steps of mixing a polyetheramine and a functional moiety, and reacting the polyetheramine and the functional moiety to produce the functional coating. In certain aspects, the method further includes the steps of mixing a silica nanoparticle and a functional compound, and reacting the silica nanoparticle and the functional compound to produce the determinant nanosilica particle, where the nanosilica nanoparticle includes a functionalized silica nanoparticle. In certain aspects, the dynamic initiator is selected from the group consisting of a change in temperature, a change in pH, exposure to ultraviolet radiation, a change in electric field, and a change in magnetic field.

In a second aspect, a method of using a nanosilica-containing cement in an well cementing operation is provided. The method includes the steps of mixing encapsulated nanosilica and a cement formulation to produce the nanosilica-containing cement formulation, where the encapsulated nanosilica includes determinant nanosilica particles encapsulated by a reversible cage, where the reversible cage includes a functional coating, pumping the nanosilica-containing cement formulation into the oil well, altering a temperature in the oil well to initiate the disintegration of the reversible cage, exposing the determinant nanosilica particles due to the disintegration of the reversible cage from the encapsulated nanosilica, and reacting the determinant nanosilica particles with the cement formulation such that gelation of the cement formulation occurs.

In certain aspects, the method includes the steps of mixing an amount of the determinant nanosilica particles and a functional coating, and applying a dynamic initiator to trigger a reversible reaction of the functional coating to produce the reversible cage, where the reversible cage surrounds the determinant nanosilica particle to produce the encapsulated nanosilica. In certain aspects, the method further includes the steps of mixing a polyetheramine and a functional moiety, and reacting the polyetheramine and the functional moiety to produce the functional coating. In certain aspects, the determinant nanosilica particles are selected from the group consisting of silica nanoparticles, functionalized silica nanoparticles, and combinations of the same.

In a third aspect, a composition to provide on-demand release of a silica nanoparticle into a cement formulation is provided. The composition includes a determinant nanosilica particle, the determinant nanosilica particle selected from the group consisting of a silica nanoparticle, a functionalized silica nanoparticle, and combinations of the same, a reversible cage such that the reversible cage surrounds the determinant nanosilica particle, where the reversible cage includes a functional coating, where the functional coating includes a polyetheramine and a functional moiety, and the cement formulation includes water and a cement.

In certain aspects, the reversible cage is formed through a reversible reaction, where the reversible reaction is selected from the group consisting of a reversible covalent reaction, a non-covalent reaction, and combinations of the same. In certain aspects, the reversible reaction is a reversible covalent reaction selected from the group consisting of reversible hydrazone formation, reversible Schiff base formation, reversible aminal formation, reversible cyclization formations, reversible disulfide exchange, reversible dithioacetal exchange, reversibly dynamic boronic ester formation, reversible olefin metathesis, and reversible metal-ligand association, and combinations of the same. In certain aspects, the reversible covalent reaction is a reversible cyclization formation includes a reversible Diels-Alder condensation. In certain aspects, the reversible reaction is a non-covalent reaction selected from the group consisting of an electrostatic reaction, a hydrogen bonding reaction, a Van der Waals interaction, a charge-transfer complexation, ionic bonding interactions, and combinations of the same. In certain aspects, the polyetheramine is selected from the group consisting of a monoamine polyetheramine, a diamine polyetheramine, a triamine polyetheramine and combinations of the same. In certain aspects, the cement is selected from the group consisting of a Portland cement, where the Portland cement includes calcium silicates, aluminosilicates, and combinations of the same. In certain aspects, the functionalized nanosilica particle includes a functional compound and a silica nanoparticle, where the functional compound is selected from the group consisting of a maleimide moiety, a furfuryl moiety, an anthracene moiety, trimethoxysilanes, triethoxy silanes, trichlorosilanes, anyhydride functional silanes, epoxy functional silanes, isocyanate functional silanes, sulphur functional silanes, and combinations of the same. In certain aspects, the functional moiety is selected from the group consisting of a furfuryl moiety, an anthracene moiety, a maleimide moiety, and combinations of the same. In certain aspects, the cement is present in an amount between 0.05% by weight of cement and 10% by weight of cement.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope of the embodiments.

Accordingly, the embodiments described are set forth without any loss of generality, and without imposing limitations, on the embodiments. Those of skill in the art understand that the scope includes all possible combinations and uses of particular features described in the specification.

The encapsulated nanosilica compositions described here advantageously provide for on-demand release of determinant nanosilica particles. The determinant nanosilica particles can be released from their reversible cage due to a change in temperature. Advantageously, the encapsulated nanosilica can be used in cement compositions, where the released determinant nanosilica particles can improve the cement properties. Advantageously, the encapsulated nanosilica can be better dispersed in the cement formulations compared to silica nanoparticles without encapsulation. Advantageously, the encapsulated nanosilica can be well dispersed at high nanosilica loadings in the cement, such as greater than 1% by weight of cement (bwoc) while maintaining a stabilized cement formulation. Advantageously, the encapsulated nanosilica provides a method to modulate the reactivity of determinant nanosilica particles in cement formulations. Advantageously, the functional moieties of the polyetheramine that forms the reversible cage enable the reversible reaction. Advantageously, the nanosilica-containing cement formulations can improve cement properties and processes, including acceleration of the cementing process, early gel strength development, reduction of cement porosity, greater control over cement formulation rheology and improvements on colloidal silica nanoparticle dispersions can be achieved.

In order to mitigate the issues of cement slurry gelation, the methods to encapsulate the nanosilica particles render the nanoparticles inert to the surrounding cement slurry. The compositions and methods described can delay release of the nanosilica particles to the cement slurry such that the gelation phenomena are not observed when the cement slurry is being placed in the well. The triggered release of the nanosilica particles allows for the exposure of the nanosilica particles to the cement when already placed and such that the rheological side effects of nanosilica particles do not inhibit the pumpability of the cement slurry. The encapsulated nanosilica can ease dispersion and help to mitigate agglomeration that is often seen with uncoated or bare silica nanoparticles. Additionally, the temperature conditions in the placement location can further accelerate the strength development of the cement already accelerated by the nanosilica.

As used throughout, "degree of functionalization" refers to the number of functional groups on an individual silica nanoparticles that are replaced with the anthracene moiety or the number of functional groups on all the silica nanoparticles that are replaced with the anthracene moiety, as the case may be.

As used throughout, "monoamine polyetheramine" refers to a polyetheramine with one functional amine having the formula Formula I where x can be 1 or 6 and y can be 9 or 29.

As used throughout, "diamine polyetheramine" refers to a polyetheramine with two functional amines. Diamine polyetheramines suitable for use in the compositions include diamine polyetheramine of Formula II,

Formula II diamine polyetheramine of Formula III,

Formula III where x can be 2.5, 6.1, 33, or 68
diamine polyetheramine of Formula IV, Formula IV where y can be 9, 12.5, or 39 and (x+z) can be 3.6 or 6 and combinations of the same.

As used throughout, "triamine polyetheramine" refers to a polyetheramine with three functional amines having the formula Formula V where x+y+z can be 5, 6, 50, or 85 and R can be a hydrogen (H) or an ethyl group (—CH2CH3).

As used throughout, "nanosilica loading" refers to the amount of nanosilica solids per unit volume of fluid.

As used throughout, "disintegrate" or "disintegration" means breaking into smaller parts or pieces, such as fragmentation. In the context of disintegration of molecules, the parent molecule breaks into smaller, lower molecular weight species.

As used throughout, "molecular cage" refers to an arrangement where the nanosilica is covalently bound to the encapsulating material.

As used throughout, "supramolecular cage" refers to an arrangement where the nanosilica is non-covalently bound the encapsulating material.

Compositions are directed to an encapsulated nanosilica. The encapsulated nanosilica includes a determinant nanosilica particle and a reversible cage.

The determinant nanosilica particles can be any type of nanoparticle silica. In at least one embodiment, the determinant nanosilica particles can include colloidal silica nanoparticles. The determinant nanosilica particle can be silica nanoparticles, functionalized silica nanoparticles, and combinations of the same. In at least one embodiment, the encapsulated nanosilica includes a functionalized silica nanoparticle and a reversible cage. In an alternate embodiment, the encapsulated nanosilica includes a silica nanoparticle and a reversible cage.

The silica nanoparticles can be in an aqueous suspension with a concentration of silica nanoparticles in an amount between 0.05% by weight of water (bwow) and 40% bwow.

In embodiments where the determinant nanosilica particle is a functionalized silica nanoparticle, the functionalized silica nanoparticle can include silica nanoparticles functionalized with a functional compound. Examples of functional compounds include a maleimide moiety, a furfuryl moiety, an anthracene moiety, trimethoxysilanes, triethoxysilanes, trichlorosilanes, anyhydride functional silanes, epoxy functional silanes, isocyanate functional silanes, sulphur functional silanes, and combinations of the same. In at least one embodiment, the functionalized silica nanoparticle is functionalized with a maleimide moiety.

The silica nanoparticles can first be functionalized to include amine groups appended to the surface. The amine functionalized silica nanoparticles can be obtained by reacting silica nanoparticles with aminopropyl methoxysilane.

Examples of maleimide moieties suitable for use include 4,4'-bis(maleimido)diphenylmethane (BMI), 1,1'-(methylenedi-4,1-phenylene)bismaleimide, bis-ethylmaleimide, N-ethyl maleimide, N-methyl maleimide, N-carboxymaleimide, and N-maleimide.

Examples of furfuryl moieties suitable for use include furfuryl alcohol, furfuryl amine, and furfuryl thiol.

Examples of anthracene moieties suitable for use include 9-anthracene carboxylic acid, anthracene methylalcohol, mercaptomethyl anthracene, bromanthracene, chloroanthracene, bromomethyl anthracene, chloromethyl anthracene, and combinations of the same. In at least one embodiment, the anthracene moiety can be 9-anthracene carboxylic acid.

Examples of triethoxysilanes include amino-propyl triethoxysilane.

Examples of anhydride functional silanes include 3-(triethoxysilylpropylsuccinic anhydride).

Examples of epoxy functional silanes include 2-(3,4-epoxycyclohexyl)ethyltriethoxysilane, 2-(3,4-epoxycyclohexyl)ethyl-trimethoxysilane, (3-glycidoxylpropyl)trimethoxysilane, (3-glycidoxylpropyl)triethoxysilane, 5,6-epoxyhexyltriethoxysilane, 8-glycidoxyoctyltrimethoxysilane.

Examples of isocyanate functional silanes include 3-isocyanotopropyltriethoxysilane.

Examples of sulphur functional silanes include (3-mercaptopropyltrimethoxysilane, 3-mercaptopropylmethyldimethoxysilane, 3-mercaptopropyltriethoxysilane, and 2,2-dimethoxy-1-thia-2-silacyclopentane).

Figure 2:
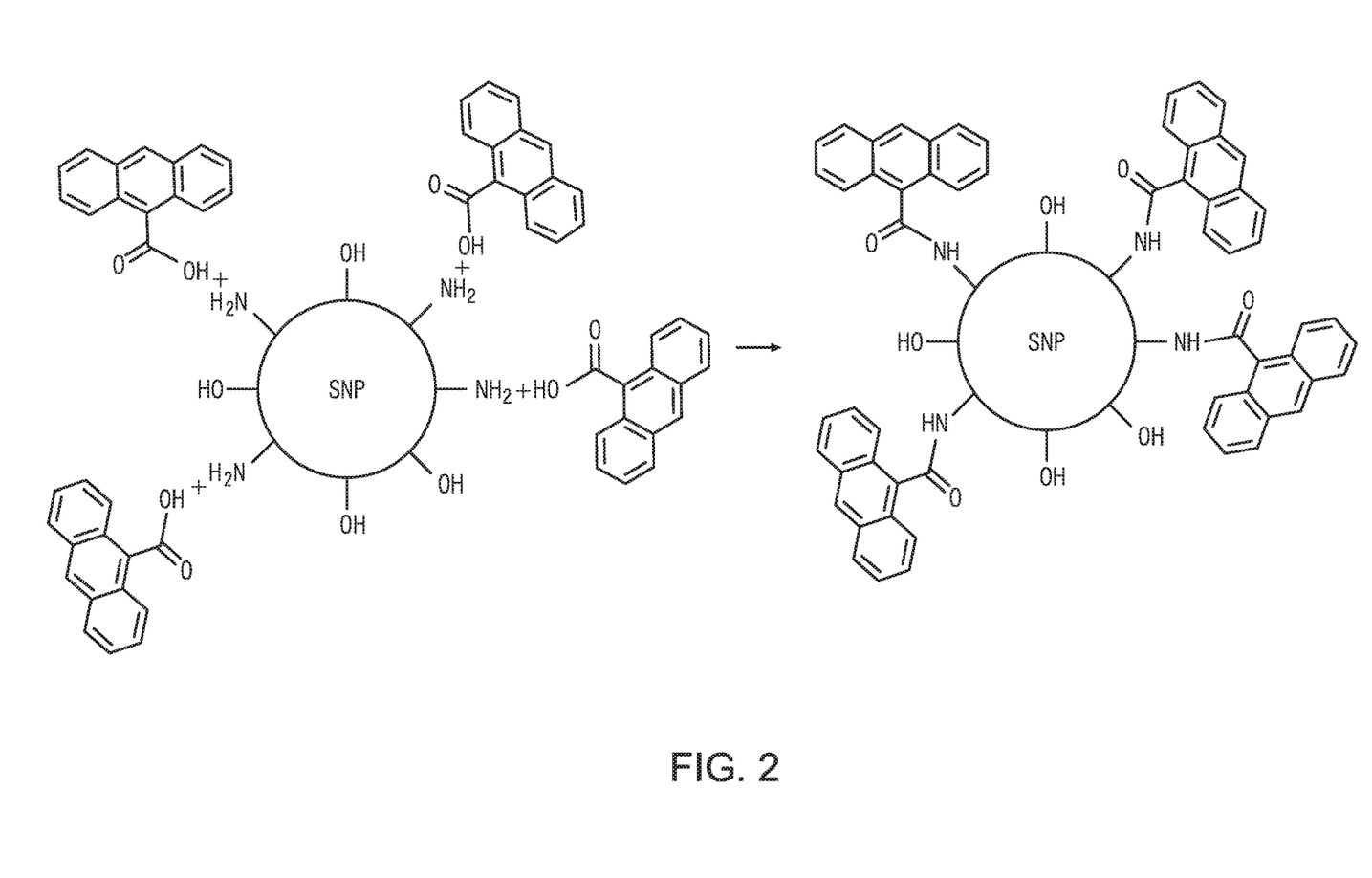
FIG. 2 is a pictorial representation of a reaction between a silica nanoparticle and an anthracene moiety.
Figure 3A:
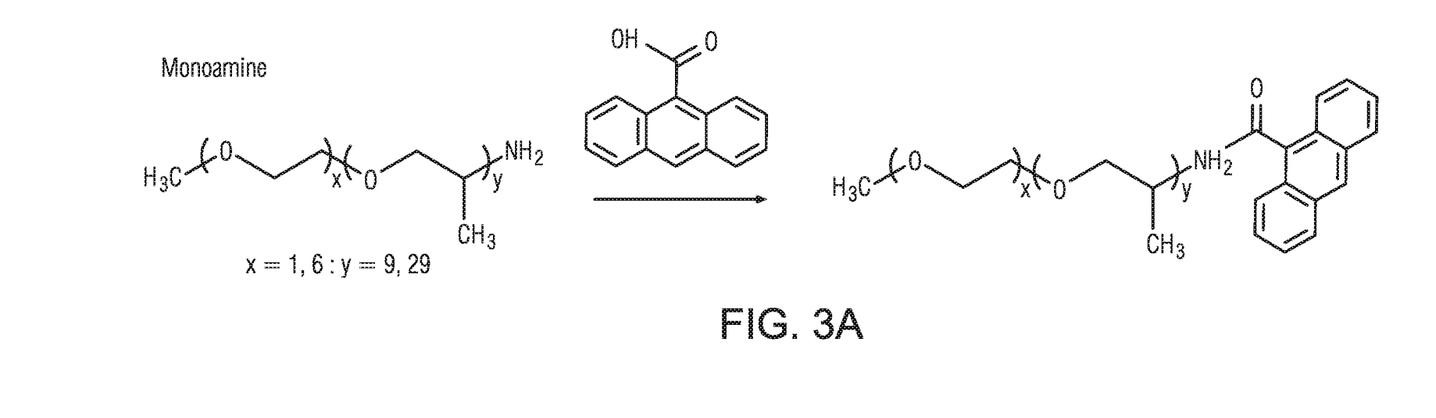
FIG. 3A is a pictorial representation of a reaction between monoamine polyetheramine and an anthracene moiety.
Figure 3B:
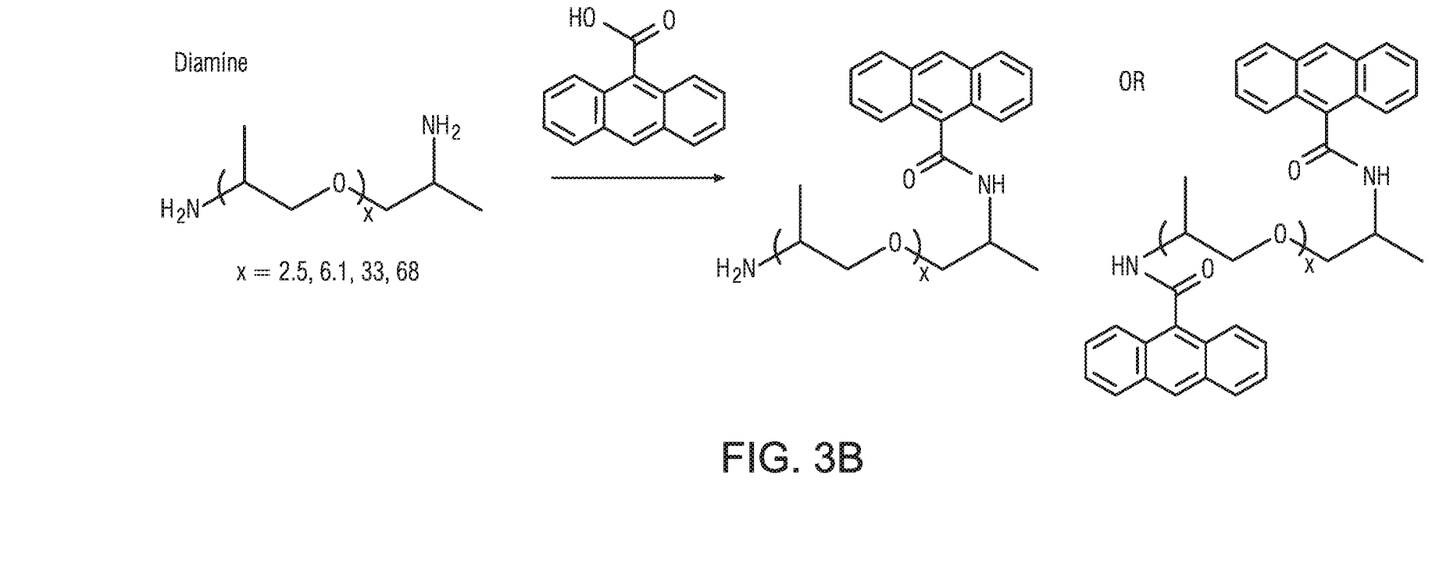
FIG. 3B is a pictorial representation of a reaction between diamine polyetheramine and an anthracene moiety.
Figure 3C:
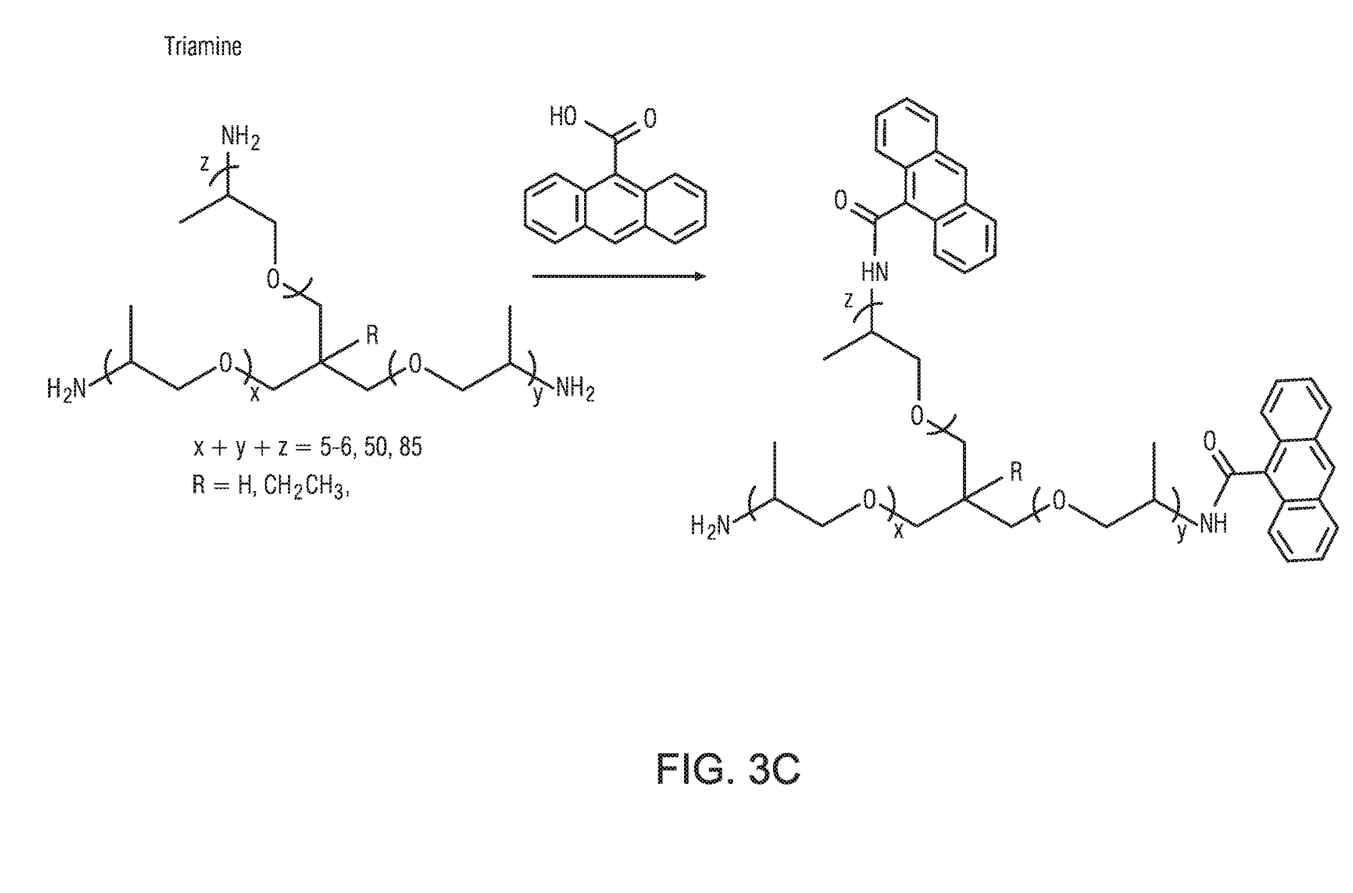
FIG. 3C is a pictorial representation of a reaction between triamine polyetheramine and an anthracene moiety.
Figure 3D:
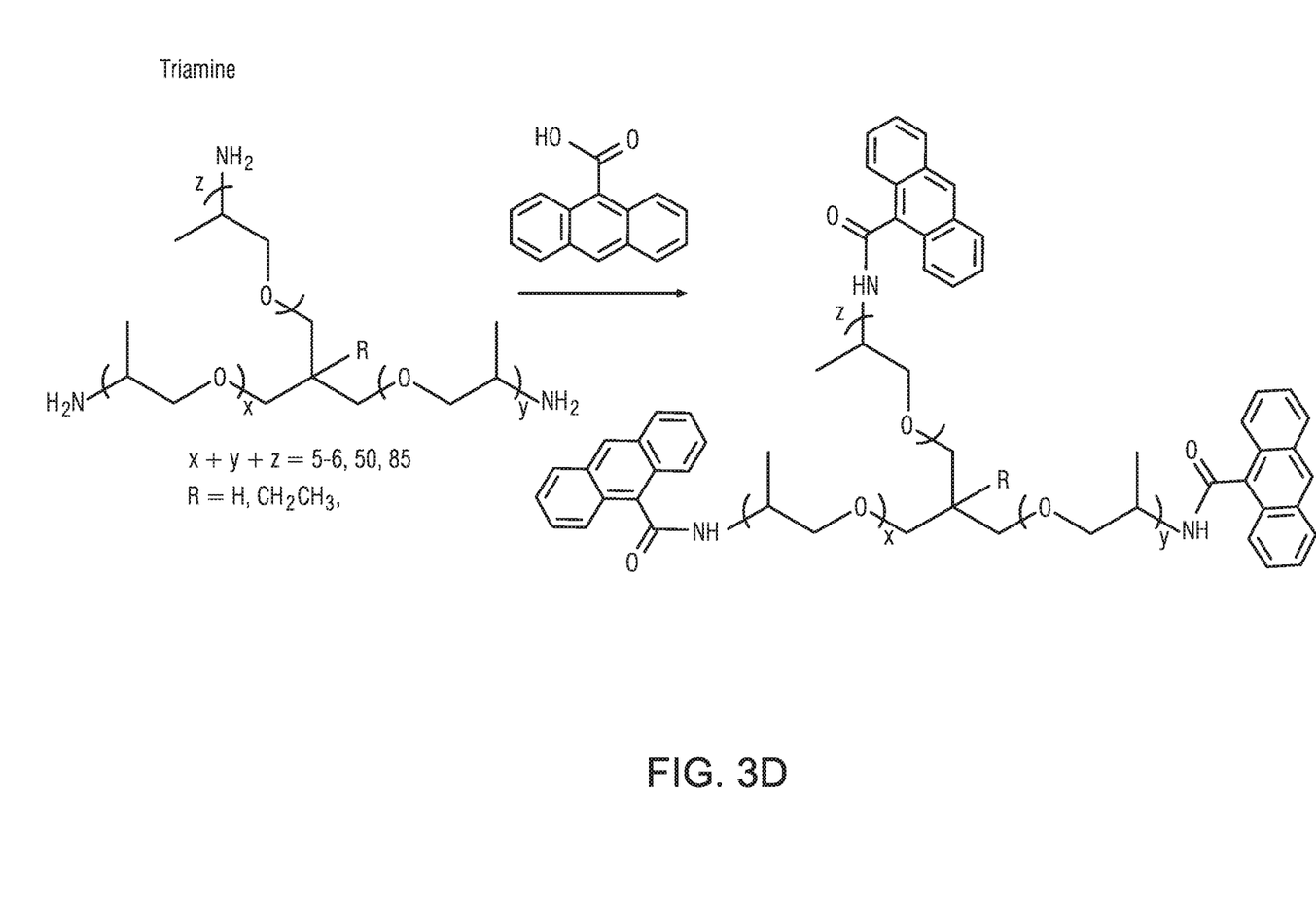
FIG. 3D is a pictorial representation of a reaction between a triamine polyetheramine and an anthracene moiety.

In embodiments where the functionalized silica nanoparticle includes an anthracene moiety as the functional compound, the silica nanoparticle can be grafted to the anthracene moiety through an amide bond to produce the functionalized silica nanoparticles. The anthracene moiety can be conjugated on the surface of the silica nanoparticle. The degree of functionalization of the silica nanoparticles can be controlled by controlling the molar ratio of the carboxyl functional groups on the anthracene moiety to the amine groups on the amine functionalized silica nanoparticles. The extent of reaction is controlled by controlling the molar volume of the anthracene moiety. Functionalized silica nanoparticles produced from the reaction of amine functionalized silica nanoparticles and 9-anthracene carboxylic acid are shown in FIG. 2. As shown in FIG. 2, the amine groups on the amine functionalized silica nanoparticles react with hydroxyl groups on the anthracene moiety in the amidation reaction.

In embodiments where the functionalized silica nanoparticle includes a maleimide moiety or a furfuryl moiety as the functional compound, the silica nanoparticle can be functionalized by a [4+2] Diels-Alder cycloaddition reaction at temperatures up to 80° C. At temperatures greater than 130° C. the reaction is a retro-Diels Alder reaction.

In at least one embodiment, the functional compounds on the surface of the nanosilica can react covalently such that the interaction on the surface results in the formation or breakage of covalent bonds. In at least one embodiment, the functional compounds can react noncovalently such that there is the spontaneous supramolecular association of the surface functional compounds with other molecules in the system. In at least one embodiment, the functional compounds can react noncovalently such that there is the supramolecular disassociation of the surface functional compounds with other molecules in the system. In at least one embodiment, the surface functional compounds leads to the supramolecular disassociation of other supramolecularly bonded species in the system. In at least one embodiment, the functional compounds are inert or nonreactive to other molecular species in the system.

The reversible cage is a polymer coating surrounding the determinant nanosilica particles. The reversible cage can be a molecular cage or a supramolecular cage. The reversible cage can include a functional coating. The reversible cage is hydrophilic. Advantageously, the hydrophilic nature of the reversible cage enables the dispersion of the encapsulated nanosilica. The reversible cage surrounds the determinant nanosilica particle preventing reaction between the determinant nanosilica particle and the cement formulation.

The functional coating can include a polyetheramine and a functional moiety. The polyetheramine can be a hydrophilic linear polyetheramine, hydrophilic branched polyetheramine, or combinations of the same. The polyetheramine can be selected from the group consisting of monoamine polyetheramines, diamine polyetheramines, triamine polyetheramines, and combinations of the same. Monoamine polyetheramine and diamine polyetheramine are hydrophilic linear polyetheramines and triamine polyetheramine is a hydrophilic branched polyetheramine.

The functional moiety can be a furfuryl moiety, an anthracene moiety, and a maleimide moiety, and combinations of the same. The furfuryl moiety can include furfuryl alcohol, furfuryl amine, and furfuryl thiol.

Examples of furfuryl moieties suitable for use as the functional moiety include furfuryl alcohol, furfuryl amine, and furfuryl thiol.

The functional moiety can be covalently grafted to a polyalkylene glycol or polyalkylene glycol amine. In at least one embodiment, the furfuryl alcohol can undergo a condensation reaction with the polyalkylene glycol with the elimination of water. In at least one embodiment, the furfuryl alcohol can be oxidized to furoic acid. The furoic can then be condensed with the polyalkylene glycol amine to render the grafted furfuryl polyalkylene glycol through an amide functional group.

The anthracene moiety can be any type of anthracene compound containing a chemically reactive functional group such that the anthracene can be grafted to the polyetheramine. Examples of anthracene moieties suitable for use include 9-anthracene carboxylic acid, anthracene methylalcohol, mercaptomethyl anthracene, bromanthracene, chloroanthracene, bromomethyl anthracene, chloromethyl anthracene, and combinations of the same. In at least one embodiment, the anthracene moiety can be 9-anthracene carboxylic acid.

In embodiments where the functional moiety is an anthracene moiety, the polyetheramine can undergo an amidation reaction with the anthracene moiety to produce the functional coating. The degree of functionalization of the polyetheramine can be controlled by controlling the molar ratio of the carboxyl functional groups on the anthracene moiety to the amine groups on the polyetheramine. Reactions of diamine polyetheramines and triamine polyetheramines with the anthracene moiety can be controlled such that all of the amine groups on the polyetheramine react with a carboxyl group and alternately can be controlled such that only a portion of the amine groups on the polyetheramine react. The extent of reaction is controlled by controlling the molar volume of the anthracene moiety. Functional coatings produced from the reaction of a polyetheramine and 9-anthracene carboxylic acid are shown in FIG. 3A, FIG. 3B, FIG. 3C and FIG. 3D.

In at least one embodiment, the reversible reaction is a reversible cyclization formation the functional moiety can be a furfuryl moiety or an anthracene moiety.

In at least one embodiment, the dynamic initiator of the reversible reaction is change in temperature, the functional compound is a furfuryl moiety, and the functional moiety is a furfuryl moiety. The change in temperature as the dynamic initiator triggers the reaction of the diene and dienophile in the forward and reverse direction.

In at least on embodiment, the dynamic initiator of the reversible reaction is the non-covalent reaction of an electrostatic reaction, the functional compound is amino-propyl triethoxysilane which creates an amino functionalized silica nanoparticle. The electrostatic reaction can associate an anionic polymer with the amino functionalized silica nanoparticle. Examples of the anionic polymer include polyanionic cellulose, polyacrylic acid, polyglutamic acid, and combinations of the same. Polyanionic cellulose can also be used in place of polyalkylene glycol as a spacer between furfuryl groups.

The functional moiety can be present in the functional coating in an amount between 0.1 equivalents to 100,000 equivalents of the functional coating.

The determinant nanosilica particles and the functional coating can be mixed together. A reversible reaction can be triggered by a dynamic initiator to produce the reversible cage from the functional coating that surrounds the determinant nanosilica particle forming the encapsulated nanosilica. A reversible reaction is a reaction which can favor products over reactants or reactants over products, irrespective of time. The reversible reaction can be a reversible covalent reaction, a non-covalent reaction, or combinations of the same. Examples of a reversible covalent reaction include a reversible hydrazone formation, a reversible Schiff base formation, a reversible aminal formation, a reversible cyclization formations, a reversible disulfide exchange, a reversible dithioacetal exchange, reversibly dynamic boronic ester formation, a reversible olefin metathesis, and a reversible metal-ligand association. The reaction that occurs is based on the functional moiety and the reaction conditions. Examples of a cyclization formation include a Diels-Alder condensation. Examples of a non-covalent reaction include an electrostatic reaction, a hydrogen bonding reaction, a Van der Waals interaction, a charge-transfer complexation, ionic bonding interactions, and combinations of the same. The dynamic initiator can be selected from a change in temperature, a change in pH, exposure to ultraviolet (UV) radiation, a change in electric field, and a change in magnetic field. The particular dynamic initiator selected depends on the functional compound of the determinant nanosilica particle, the functional moiety, and the type of reversible reaction that is initiated. In at least one embodiment, the dynamic initiator of a dianthracenyl reverse cycloaddition is exposure to ultraviolet radiation can be at a wavelength between 320 nm and 395 nm. In at least one embodiment, the dynamic initiator of a dianthracenyl reverse cycloaddition is exposure to a thermal environment where the temperature exceeds 140° C.

The reversible cage can form a coating around the silica nanoparticles. Each individual determinant nanosilica particle can be encapsulated with a reversible cage. Alternately, an aggregate of determinant nanosilica particles can be encapsulated with a reversible cage.

In embodiments including a functionalized silica nanoparticle as the determinant nanosilica particle, the functionalized silica nanoparticles can react through reversible reaction with the functional coating to produce the reversible cage that surrounds the functionalized silica nanoparticle and produces the encapsulated nanosilica. The reversible reaction between the functionalized silica nanoparticle and the functional coating can be triggered by a dynamic initiator.

In embodiments where the encapsulated nanosilica includes a silica nanoparticle as the determinant nanosilica particle, the unreacted amines on both the silica nanoparticles and the functional coating undergo hydrogen bonding.

Covalent bonding can occur between the anthracene moiety of the functional coating which results in the reversible cage.

An advantage of the encapsulated nanosilica is the reversible cage that encapsulates the determinant nanosilica particle can disintegrate. In at least one embodiment, the disintegration can be due to an increase in the temperature of the encapsulated nanosilica. The temperature to trigger disintegration of the reversible cage depends on the functional compound on the silica nanoparticle, the functional moiety on the polyetheramine, and the reversible reaction used to produce the reversible cage. The temperature can be increased to greater than 130° C. (266° F.). In at least one embodiment, the disintegration can be due to natural breakdown, such as hydrolyzation of the polymer. Regardless of the cause of disintegration, the fragmentation half-life is between 30 minutes and 12 hours at the bottom hole circulating temperature.

Figure 1:
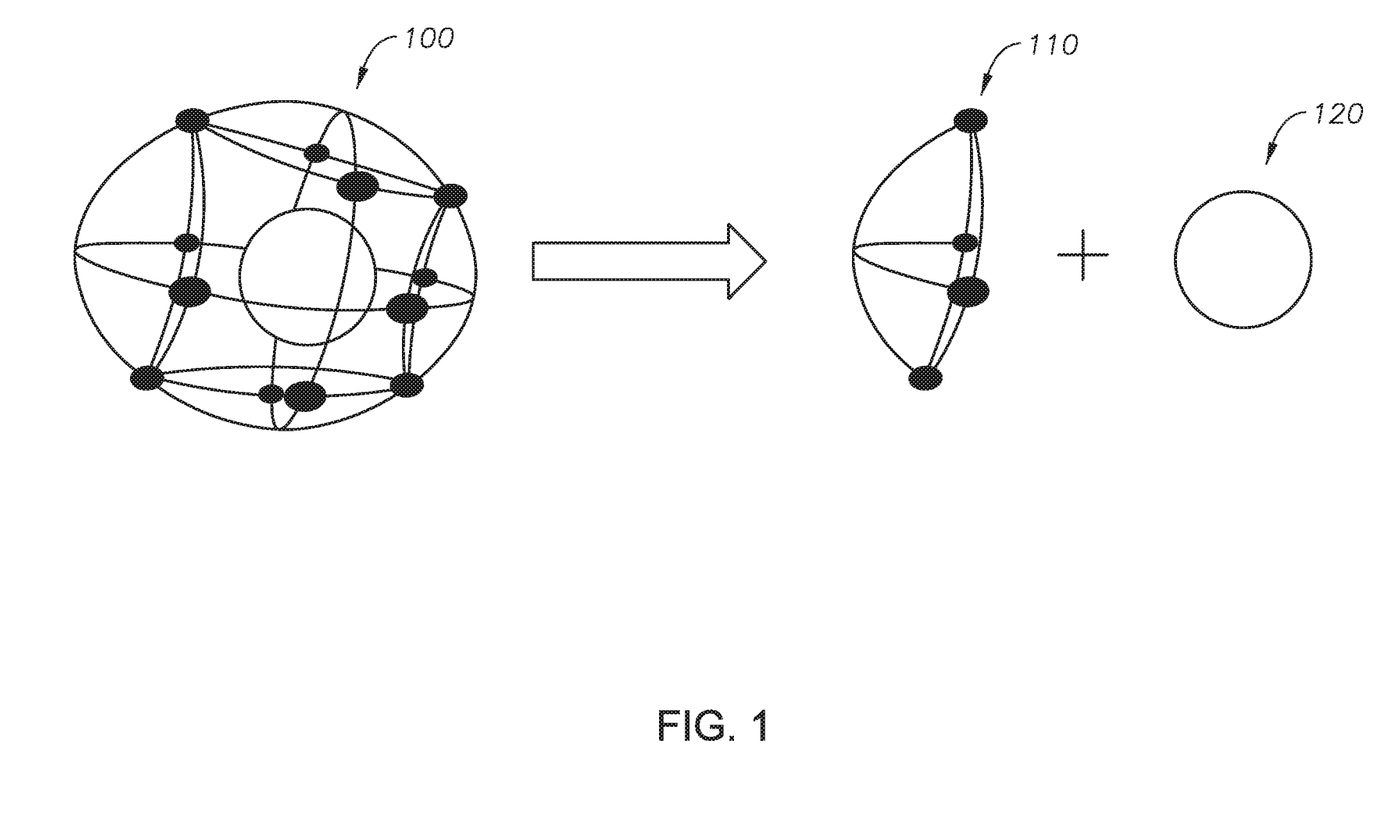
FIG. 1 is a schematic representation of an encapsulated nanosilica after a change in temperature results in the disintegration of the reversible cage into cage fragments and the determinant nanosilica particle.

The disintegration of the reversible cage is due to the breakdown of the bonding between the anthracene moieties. A schematic of the disintegration of the reversible cage is shown in FIG. 1. Referring to FIG. 1, encapsulated nanosilica 100 disintegrates upon application of heat to produce cage fragment 110 and determinant nanosilica particle 120.

Encapsulated nanosilica can be used in well cementing operations and in construction industry cementing operations.

In at least one embodiment, the encapsulated nanosilica can be mixed in cement formulations to produce nanosilica-containing cement formulations. The nanosilica-containing cement formulations include encapsulated nanosilica and cement formulations. The cement formulations can include water and a cement. The cement can be any Portland cement containing calcium silicates, aluminosilicates, or combinations of the same. The nanosilica-containing cement formulations can contain between 0.05% by weight of cement (bwoc) and 10% bwoc. Advantageously, the reversible cage can stabilize the encapsulated nanosilica in the nanosilica-containing cement formulations, such that the determinant nanosilica particles have a zeta potential magnitude between 20 mV and –20 mV, inclusive. The reversible cage enhances the ability to disperse the encapsulated nanosilica in the cement formulations relative to silica nanoparticles without an encapsulation producing a well-dispersed mixture. The effect of the reversible cage on the dispersion of the encapsulated is observed at increased nanosilica loadings. Advantageously, the reversible cage of the encapsulated nanosilica can reduce agglomerations of silica nanoparticles due in part to the hydrophilic nature of the reversible cage. Advantageously, the reversible cage of the encapsulated nanosilica can maintain the pumpability of the nanosilica-containing cement formulations at increased nanosilica loading.

The reversible cage can act as a protective barrier isolating the determinant nanosilica particles from calcium silicates in the cement and their reaction products with water. Isolating the determinant nanosilica particles can delay reaction between the determinant nanosilica particles and calcium silicates until desired, such that the cement properties can be optimized when the cement formulation is the desired location.

Increasing the temperature of encapsulated nanosilica and triggering the disintegration of the reversible cage leaves the determinant nanosilica particle dispersed in the cement formulation. The determinant nanosilica particle dispersed in the cement formulation can improve the properties of the cement and set cement, including improving the mechanical properties, accelerating the cement set time, and serving as a gas migration additive. The dispersed determinant nanosilica particle can accelerate the hydration reaction of the calcium silicate to produce calcium-silicate-hydrate, or set cement. The functional compound does not participate in the hydration reactions of the calcium silicate. In at least one embodiment, the silica nanoparticle or the functionalized silica nanoparticle can undergo a pozzolanic reaction to yield a calcium silicate hydrate. In at least one embodiment, the silica nanoparticle can act as a nucleation site during cement hydration. Cement properties that can be improved include reduced gas migration, improved initial gel strength of the cement, improved mechanical strength of the set cement, and accelerated cement setting.

The nanosilica-containing cement formulations provide a composition for on-demand release of silica nanoparticles into a cement formulation. The application of the dynamic initiator can be applied selectively to a portion of the nanosilica-containing cement formulations. Selective application of the dynamic initiator provides the ability to modulate the reactivity of the determinant nanosilica particles.

The temperature of the nanosilica-containing cement formulation can be altered such that gelation of the cement slurry induced by the silica nanoparticles occurs at a desired point. The temperature can be altered after the nanosilica-containing cement formulations have been pumped into place, during the step of pumping the nanosilica-containing cement formulations, or before pumping begins. In at least one embodiment, the temperature is altered after the nanosilica-containing cement formulations have been pumped into a well.

The reactions between nanosilica particles and calcium in the cement can begin to occur within 1 minute of the dynamic initiator being applied, alternately within 5 minutes of the dynamic initiator being applied, and alternately within 1 hour of the dynamic initiator being applied. The reactions can continue until the reactants are depleted or the hardened cement reduces the ability for the reactants to interact.

Although the embodiments have been described in detail, it should be understood that various changes, substitutions, and alterations can be made hereupon without departing from the principle and scope. Accordingly, the scope of the embodiments should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

As used here and in the appended claims, the words "comprise," "has," and "include" and all grammatical variations thereof are each intended to have an open, non-limiting meaning that does not exclude additional elements or steps.

That which is claimed is:

1. A method of using a nanosilica-containing cement in an well cementing operation, the method comprising the steps of:

mixing encapsulated nanosilica and a cement formulation to produce the nanosilica-containing cement formulation, where the encapsulated nanosilica comprises determinant nanosilica particles encapsulated by a reversible cage, where the reversible cage comprises a functional coating,
  where the functional coating comprises a polyetheramine and a functional moiety selected from the group consisting of a furfuryl moiety, an anthracene moiety, a maleimide moiety, and combinations of the same,
  where the reversible cage is formed through a reversible reaction selected from the group consisting of a reversible covalent reaction, a non-covalent reaction, and combinations of the same,
  where the determinant nanosilica particles are selected from the group consisting of silica nanoparticles, functionalized silica nanoparticles, and combinations of the same;
pumping the nanosilica-containing cement formulation into the oil well;
increasing a temperature in the oil well to initiate the disintegration of the reversible cage, wherein the temperature is increased to greater than 130° C.;
exposing the determinant nanosilica particles due to the disintegration of the cage from the encapsulated nanosilica; and
reacting the determinant nanosilica particles with the cement formulation such that gelation of the cement formulation occurs.

2. The method of claim 1, where the reversible reaction is a reversible covalent reaction selected from the group consisting of reversible hydrazone formation, reversible Schiff base formation, reversible aminal formation, reversible cyclization formations, reversible disulfide exchange, reversible dithioacetal exchange, reversibly dynamic boronic ester formation, reversible olefin metathesis, reversible metal-ligand association, and combinations of the same.

3. The method of claim 2, where the reversible covalent reaction is a reversible cyclization formation comprising a reversible Diels-Alder condensation.

4. The method of claim 1, where the reversible reaction is a non-covalent reaction selected from the group consisting of an electrostatic reaction, a hydrogen bonding reaction, a Van der Waals interaction, a charge-transfer complexation, ionic bonding interactions, and combinations of the same.

5. The method of claim 1, where the polyetheramine is selected from the group consisting of a monoamine polyetheramine, a diamine polyetheramine, a triamine polyetheramine and combinations of the same.

6. The method of claim 1, where the functionalized nanosilica particle comprises a functional compound and a silica nanoparticle, where the functional compound is selected from the group consisting of a maleimide moiety, a furfuryl moiety, an anthracene moiety, trimethoxysilanes, triethoxy silanes, trichlorosilanes, anyhydride functional silanes, epoxy functional silanes, isocyanate functional silanes, sulphur functional silanes, and combinations of the same.

* * * * *